(12) United States Patent
Wade et al.

(10) Patent No.: US 10,505,354 B2
(45) Date of Patent: Dec. 10, 2019

(54) JUNCTION BOX

(71) Applicant: Sasquatch Solar, LLC, Holladay, UT (US)

(72) Inventors: Benjamin Wade, Holladay, UT (US); Lee Hatley, Arvada, CO (US)

(73) Assignee: Sasquatch Solar, LLC, Holladay, UT (US)

( * ) Notice: Subject to any disclaimer, the term of this patent is extended or adjusted under 35 U.S.C. 154(b) by 0 days.

(21) Appl. No.: 16/259,887

(22) Filed: Jan. 28, 2019

(65) Prior Publication Data
US 2019/0334333 A1    Oct. 31, 2019

Related U.S. Application Data

(63) Continuation-in-part of application No. 15/963,707, filed on Apr. 26, 2018, now Pat. No. 10,230,227.

(51) Int. Cl.
| | |
|---|---|
| *H02G 3/10* | (2006.01) |
| *H02G 3/08* | (2006.01) |
| *H02G 1/06* | (2006.01) |
| *H02G 3/14* | (2006.01) |

(52) U.S. Cl.
CPC ............. *H02G 3/086* (2013.01); *H02G 1/06* (2013.01); *H02G 3/085* (2013.01); *H02G 3/14* (2013.01)

(58) Field of Classification Search
None
See application file for complete search history.

(56) References Cited

U.S. PATENT DOCUMENTS

| | | | | |
|---|---|---|---|---|
| 3,910,448 | A | * | 10/1975 | Evans ................ B29C 65/68 220/3.8 |
| 5,661,264 | A | * | 8/1997 | Reiker ................ H02G 3/121 174/50 |
| 6,023,247 | A |  | 2/2000 | Rodeffer |
| 6,271,467 | B1 |  | 8/2001 | Book et al. |
| 6,526,701 | B2 |  | 3/2003 | Stearns et al. |
| 6,942,189 | B2 |  | 9/2005 | Capozzi et al. |
| 7,109,415 | B2 |  | 9/2006 | Neitzel et al. |
| 7,154,040 | B1 |  | 12/2006 | Tompkins |
| 7,353,961 | B2 |  | 4/2008 | Hull et al. |
| 7,626,118 | B1 |  | 12/2009 | Capozzi |
| 8,479,455 | B2 |  | 7/2013 | Schaefer et al. |
| 9,496,697 | B1 |  | 11/2016 | Wentworth |
| 9,819,166 | B1 |  | 11/2017 | Capozzi |
| 9,935,356 | B2 |  | 4/2018 | Wentworth |

\* cited by examiner

*Primary Examiner* — Dimary S Lopez Cruz
(74) *Attorney, Agent, or Firm* — Maschoff Brennan

(57) ABSTRACT

A junction box may include a flashing that defines a first groove. The junction box may include a housing attached to the flashing and positioned at least a first distance from a plurality of edges of the flashing. The housing may include a plurality of sidewalls that form a plurality of joints. The plurality of joints may include a first joint formed by a first sidewall and a second sidewall that is oriented towards a first edge of the flashing. The housing may include a bottom portion attached to the plurality of sidewalls and that defines a second groove. The second groove may include a second center axis that is substantially coincident with a first center axis of the first groove. The second groove may be located on a substantially parallel plane to the first groove. The second groove may indicate a suitable hole position in the bottom portion.

20 Claims, 12 Drawing Sheets

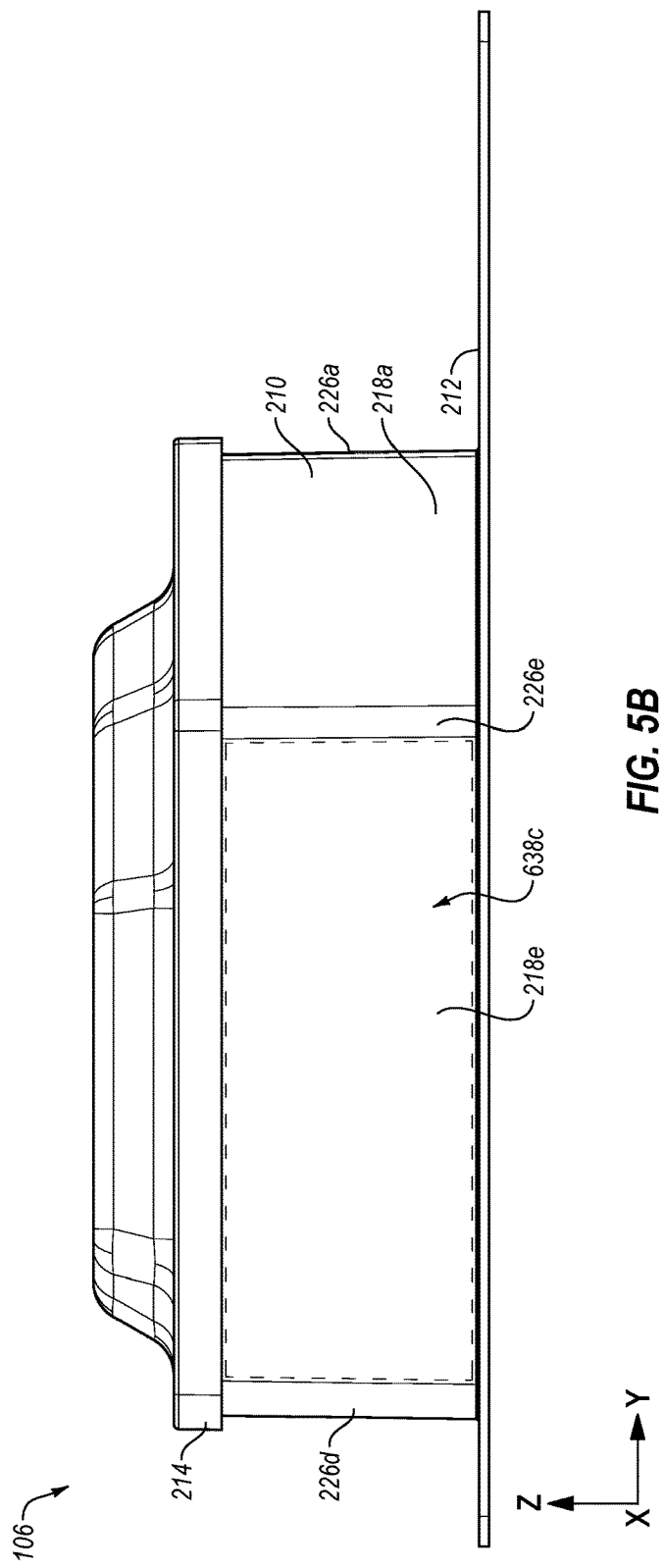

JUNCTION BOX

CROSS-REFERENCE TO RELATED APPLICATION

This patent application claims the benefit of and priority to U.S. patent application Ser. No. 15/963,707 filed Apr. 26, 2018, titled "OUTDOOR JUNCTION BOX", which is incorporated in the present disclosure by reference in its entirety.

FIELD

The embodiments described in the present disclosure are related to junction boxes, in particular some embodiments are related to junction boxes.

BACKGROUND

Junction boxes may be used to receive, route, and connect portions of utility systems. For instance, electrical junction boxes may receive electrical cables from multiple electrical components. The electrical cables may be electrically coupled to one another within the electrical junction boxes. Such electrical coupling may electrically couple the multiple electrical components. The junction boxes may be covered or otherwise closed, which may reduce interaction with the electrical cables coupled therein.

Junction boxes used in interior spaces are generally comprised of metals or plastics. These junction boxes are poorly suited for use in locations in which they are exposed to outdoor environmental conditions. For instance, the junction boxes comprised of metals or plastics may rust or deteriorate due to exposure to water and heat.

Some junction boxes may be configured for exterior or outdoor use. The exterior junction box may be used to connect and/or route cables from one or more external devices. The external junction boxes may be attached to an exterior surface of a structure and may be at least partially environmentally sealed. However, existing outdoor junction boxes suffer from several deficiencies. For instance, existing outdoor junction boxes are poorly integrated with the exterior surfaces, which may result in concentration of snow and water on the existing junction box. Additionally, installation of the existing outdoor junction boxes is difficult, which may result in poorly attached outdoor junction boxes.

The subject matter claimed herein is not limited to embodiments that solve any disadvantages or that operate only in environments such as those described above. Rather, this background is only provided to illustrate one example technology area where some embodiments described herein may be practiced.

SUMMARY OF SOME EXAMPLE EMBODIMENTS

In an example embodiment, a junction box may include a flashing. The flashing may define a first groove. The junction box may also include a housing. The housing may be attached to the flashing and positioned at least a first distance from a plurality of edges of the flashing. The housing may include a plurality of sidewalls. The plurality of sidewalls may form a plurality of joints. Additionally, the plurality of joints may include a first joint formed by a first sidewall and a second sidewall. The first joint may be oriented towards a first edge of the flashing. The housing may also include a bottom portion. The bottom portion may be attached to the plurality of sidewalls. Additionally, the bottom portion may define a second groove. The second groove may include a second center axis that is substantially coincident with a first center axis of the first groove. Likewise, the second groove may be located on a substantially parallel plane to the first groove. The second groove may be configured to indicate a suitable hole position in the bottom portion.

These example embodiments are mentioned not to limit or define the disclosure, but to provide examples to aid understanding thereof. Additional embodiments are discussed in the Detailed Description, and further description is provided there. Advantages offered by one or more of the various embodiments may be further understood by examining this specification or by practicing one or more embodiments presented.

BRIEF DESCRIPTION OF THE FIGURES

These and other features, aspects, and advantages of the present disclosure are better understood when the following Detailed Description is read with reference to the accompanying drawings.

FIG. 5B illustrates another view of the junction box of FIG. 1;

DETAILED DESCRIPTION

Figure 1:
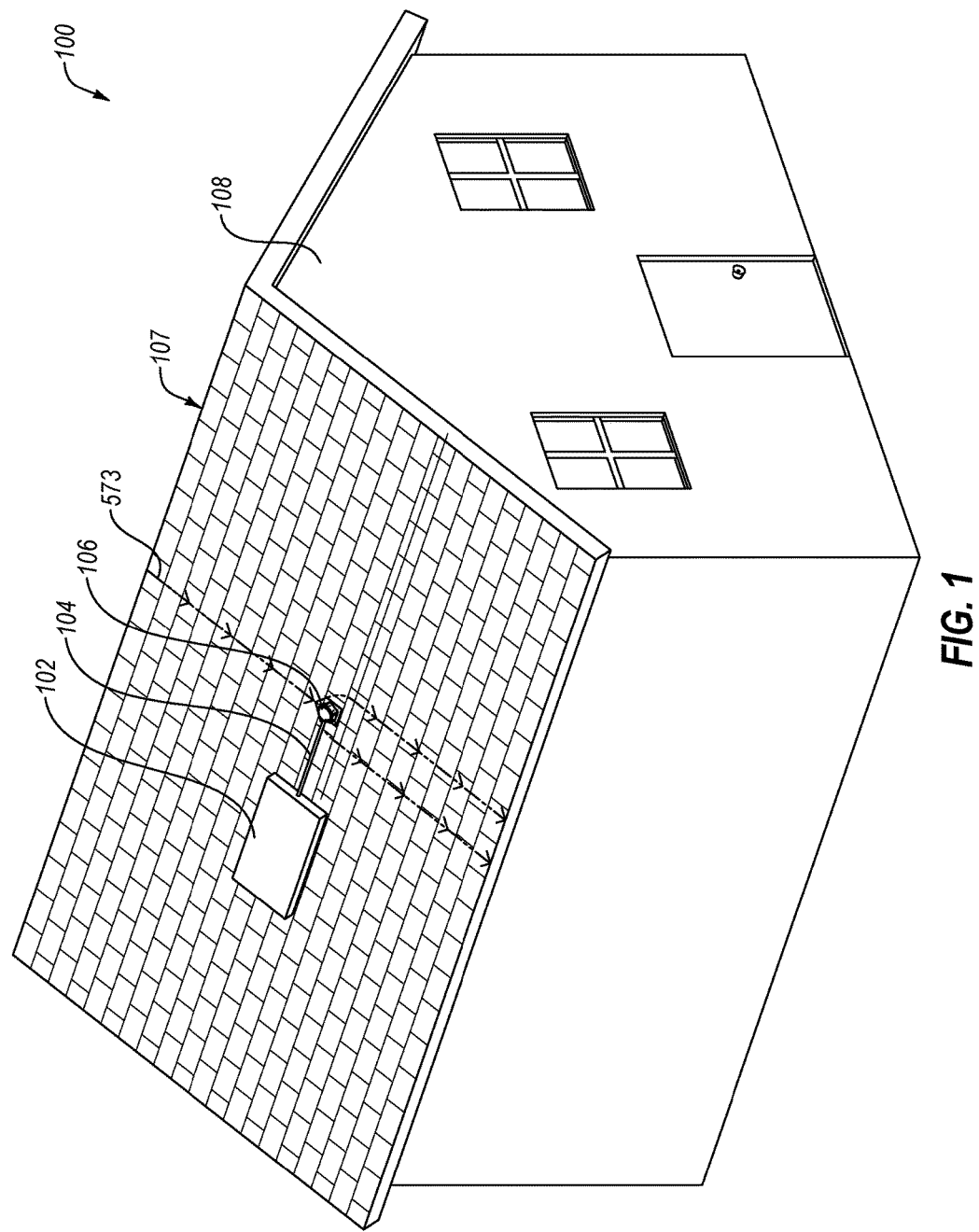
FIG. 1 illustrates an operating environment in which an example junction box may be implemented.

A junction box may be used for routing cables, wires, and/or other devices coupled to an external device located on an exterior surface of a structure to an interior space of the structure. For example, the cables, wires, and/or other devices may be coupled to a solar panel located on a roof of a house. Other devices may include coaxial cables, registered jack 45 ("RJ145") cables, and any other appropriate device. The cables, wires, and/or other devices may be routed from the external device to electrical connections located in the interior space of the structure using the junction box.

Some conventional junction boxes may include knock-outs and/or holes. The knock-outs are portions of the junction box configured to easily detach to create an opening. The knock-outs and/or the holes are located at pre-determined locations in a housing of the junction box. The openings left when the knock-outs are removed and/or the holes may enable the cables, wires, and/or other devices to be routed into the housing of the junction box. Connectors may be fitted to the housing to seal the openings and holes through which the cables, wires, and/or other devices are routed. However, the pre-determined location of the knock-outs and holes may limit where the junction box may be placed and may limit connector types that may be used in combination with the housing of the junction box.

Additionally, in some conventional junction boxes, a lid may overlap a bottom piece of the housing. In particular, the lid, when attached to the housing, may extend beyond sidewalls of the bottom piece, which may define a space between the lid and the bottom portion that is substantially unsealed. Accordingly, environmental items such as water and dirt may enter the housing through the space, which may result in damage to the cables, wires, and/or other devices in the junction box. Additionally, portions of the environmental items may enter an interior structure adjacent to the external surface to which the junction box is attached.

Housings of some conventional junction boxes may include a substantially square or rectangular shape. When these conventional junction boxes are installed, surfaces of the housing are positioned at an angle substantially perpendicular to a flow of fluid on the exterior surface of the structure (e.g., substantially parallel to an apex of the exterior surface). Accordingly, fluids (e.g., rain, snow, and/or melting snow) may pool against the surface of the housing, which may reduce a life of the junction box.

Attachment features of conventional junction boxes may limit placement relative to external surfaces. For example, some conventional junction boxes may include a pipe or conduit that extends from a bottom surface of the junction box. To check placement and fit of the junction box, a hole in the exterior surface of the structure is created prior to placement of the junction box. Additionally, the pipe or the conduit extending from the bottom surface may be fixed relative to the junction box, which may cause a problem routing the cables or wires, into the interior space of the structure. For instance, if placement of the junction box causes the pipe or the conduit to be adjacent to a rafter or other structural support.

Some conventional junction boxes may include conductive material (e.g., metal). These conventional junction boxes must be electrically grounded to pass inspection in at least some jurisdictions. The junction box may be grounded using a ground of the structure and/or a ground of the external device. Grounding the junction box may increase a number of connections to these conventional junction boxes, time involved in installation of these junction boxes, and/or a number of pieces of equipment used for installation of these junction boxes. Some conventional junction boxes may include a lid or another portion that may be selectively attached to a housing. These lids may be small or include parts that are small and thus may be easily dropped and lost, which may introduce problems passing inspection and/or cost additional expense to replace the lost lids or included parts.

Installation of junction boxes on the exterior surface of a structure may be difficult and dangerous. Junction boxes that include features that reduce time, a number of tools, and/or a number of pieces of equipment used to install the junction boxes (collectively, resources/complexity) may reduce risks and costs associated with installation of the junction boxes. In particular, reductions in the resources/complexity may be achieved by using a junction box that includes more suitable locations for routing cables, wires, and/or other devices from the external device while environmentally sealing a housing of the junction box (e.g., sealed to substantially prevent contaminants such as dirt, water, snow, or other environmental elements from entering an internal volume of the housing). Additionally, the resources/complexity may also be achieved by using a junction box that includes surfaces of the housing that sheds fluids, that retains removable pieces (e.g., a lid or other fasteners), and that are not comprised of conductive materials (e.g., does not include metal).

Accordingly, embodiments described in the present disclosure are directed to an improved junction box that addresses some or all of the shortcomings of conventional junction boxes described above. In some embodiments, a junction box may include a flashing and a housing. The flashing may be configured to be positioned between multiple layers of shingles. The flashing may cover holes that are exposed due to shingle fasteners being removed during installation of the junction box. The flashing may define a first groove. The first groove may indicate suitable placement of sealant and/or other adhesives on a first surface of the flashing. Suitable placement of the sealant and/or adhesives on the first surface of the flashing may be between a perimeter of the first groove and one or more edges of the flashing.

The junction box may include the housing, which may be attached to the flashing and positioned a distance from the edges of the flashing. The housing may include a bottom portion that defines a second groove. The second groove may indicate suitable positions for creation of a hole in a bottom portion of the housing. Cables, wires, and/or other devices may be routed into an interior space of a structure through the created hole. Additionally, in some embodiments, the second groove may indicate suitable placement of fasteners for attachment of the junction box to the exterior surface of the structure. Suitable positions for creating a hole in the bottom portion may be anywhere within the second groove.

Indicating suitable positions for the hole may permit the junction box to be attached to the exterior surface without creating holes in the exterior surface prior to placement of the junction box. The second groove may be sized so that rafters or other support structures may be adjacent to the second groove while leaving sufficient clearance for a hole to be created without drilling into the rafters or other support structures. The size and position of the second groove may permit the junction box to be positioned at a location that is functional relative to the external device rather than relative to the rafters and/or other support structures. Additionally, a size and/or a position of the second groove may correspond to the first groove.

In some embodiments, the housing may include multiple sidewalls that meet to form joints. A first joint formed by a first sidewall and a second sidewall may be oriented towards a first edge of the flashing. When installed on the structure, the first joint may be oriented towards an apex of the exterior surface (e.g., substantially parallel to a flow of a fluid on the exterior surface). The first sidewall and the second sidewall may be positioned at an angle not parallel to the first edge of the flashing. The first joint and the positioning of the first sidewall and the second sidewall may prevent and/or reduce fluid from pooling on a surface of the housing.

In some embodiments, the lid, the flashing, and the joints may define one or more areas. The areas may indicate suitable positions for creating holes in the sidewalls to route the cables, wires, and/or the other devices from the external device into the internal volume of the housing. When fastened to the sidewalls, the connector may environmentally seal the holes in the sidewalls.

Additionally, in some embodiments, the junction box may include a gasket positioned such that when the lid is attached to the housing, the gasket is compressed between the lid and a portion of the housing to environmentally seal an internal volume defined by the lid, the sidewalls, and a bottom portion of the housing. In some embodiments, the junction box may be comprised of a single unibody piece of material that forms the housing and the flashing. In these and other embodiments, the junction box may include a non-conductive material (e.g., plastic). Thus, the junction box may not require electrical grounding of the junction box. Alternatively, the junction box may include a metallic material to permit implementation of the junction box with different external surfaces of the structure that permit the use of metallic materials, for example, tile external surfaces.

FIG. 1 illustrates an example operating environment 100 in which a junction box 106 may be implemented. The operating environment 100 may include a structure 108 on which an external device 102 and the junction box 106 are installed. The external device 102 may be connected to the junction box 106 via a connection device 104. For example, the structure 108 may include an exterior surface. The exterior surface in the operating environment 100 of FIG. 1 includes a shingled roof. In other environments, the exterior surface may include, another type of roof, an exterior array, an angled wall, or another suitable exterior surface. The external device 102 and the junction box 106 may be attached to the exterior surface of the structure 108. In the embodiment of FIG. 1, the structure 108 includes a house. In other embodiments, the structure 108 may include another structure such as a shed, a garage, a solar array, or another suitable structure to which the external device 102 and/or the junction box 106 may be attached.

The external device 102 may include any device that includes cables, wires, and/or other devices that are to be routed from the external device 102 to an interior space of the structure 108. For example, the external device 102 may include a solar panel array, a satellite dish, or a battery system. The solar panel array may include photovoltaic wires that are to be routed through the junction box 106 into the interior space of the structure 108. In some embodiments, the cables, wires, and/or other devices may be routed through the exterior surface via the junction box 106. The cables, wires, and/or other devices may then electrically couple the external device 102 to an electrical device located in an interior space of the structure 108 or to a power grid. In some embodiments, the cables, wires, or other devices from multiple external devices (e.g., the external device 102) may be joined at the junction box 106.

In embodiments in which the external surface includes a shingled roof, when installed, a portion of the junction box 106 (e.g., a portion of a flashing) may be placed under a layer of shingles on the exterior surface. For example, one or more shingles may be raised away from the exterior surface and the portion of the flashing of the junction box 106 may be placed between the shingles and the exterior surface. The shingles may be shaped corresponding to a first joint, a first sidewall, and/or a second sidewall of a housing of the junction box 106. Some additional details of examples of the first joint, the first sidewall, the second sidewall, and the housing are provided elsewhere in the present disclosure. The shingles may be shaped using substantially straight lines corresponding to the first joint, the first sidewall, and/or the second sidewall of the junction box 106.

Additionally, the junction box 106 may be installed so that the first joint of the housing may be oriented towards an apex 107 of the exterior surface (e.g., a ridge line of the roof). The first joint may be oriented towards the apex 107 of the exterior surface (e.g., substantially parallel to the flow of a fluid 573 on the exterior surface). The junction box 106 may be installed below the apex 107 relative to gravity. Additionally, a first edge of the flashing may be installed substantially parallel to the apex 107 of the structure (e.g., substantially perpendicular to the flow of the fluid 573 on the exterior surface). The first sidewall and the second sidewall may be positioned at angles substantially not parallel relative to the apex 107 of the exterior surface.

The first joint, the first sidewall, and/or the second sidewall may prevent and/or reduce the fluid 573 from pooling on a surface of the junction box 106. For example, the flow of the fluid 573 may be in a direction away from the apex 107, relative to gravity, towards the junction box 106. The flow of the fluid 573 may cause at least a portion of the fluid 573 to contact the first joint of the housing, the first sidewall, and/or the first joint. The portion of the fluid 573 that contacts the first joint may contact the first joint then traverse along a surface of the first sidewall or the second sidewall. Additionally, the fluid 573 that contacts the first sidewall or the second sidewall may traverse the corresponding sidewall. The angles of the first sidewall and the second sidewall may direct the fluid 573 away from the housing. The angles of the first sidewall, the second sidewall, and the first joint may prevent the fluid 573 from pooling on a surface of the housing.

The cables, wires, and/or other devices may be routed from the external device 102 to the junction box 106 through the connection device 104. In some embodiments, the connection device 104 may include a conduit. In other embodiments, the connection device 104 may include the cables, wires, and/or other devices and a connector. In these and other embodiments, the connector may include multiple pieces configured to attach to each other and sandwich a portion of the housing surrounding a hole in a sidewall of the housing between the pieces. The connector may environmentally seal the hole in which the cables or wires are routed through. Although, the junction box 106 as illustrated includes a single connection point on a single sidewall of the junction box 106, it is understood that multiple connection points may be used on multiple sidewalls and/or a single sidewall or a single connection point may be used on multiple sidewalls.

The junction box 106 may provide an environmentally sealed device for routing cables, wires, and/or other devices from the external device 102 to the interior space of the structure 108. In some embodiments, the junction box 106 may provide an environmentally sealed device for housing wire nuts, grounding lugs, split bolt splicing, Polaris connectors, fuses, breakers or any other appropriate device or component for routing the cables, wires, and other devices from the external device 102 to the interior space of the structure 108.

Figure 2A:
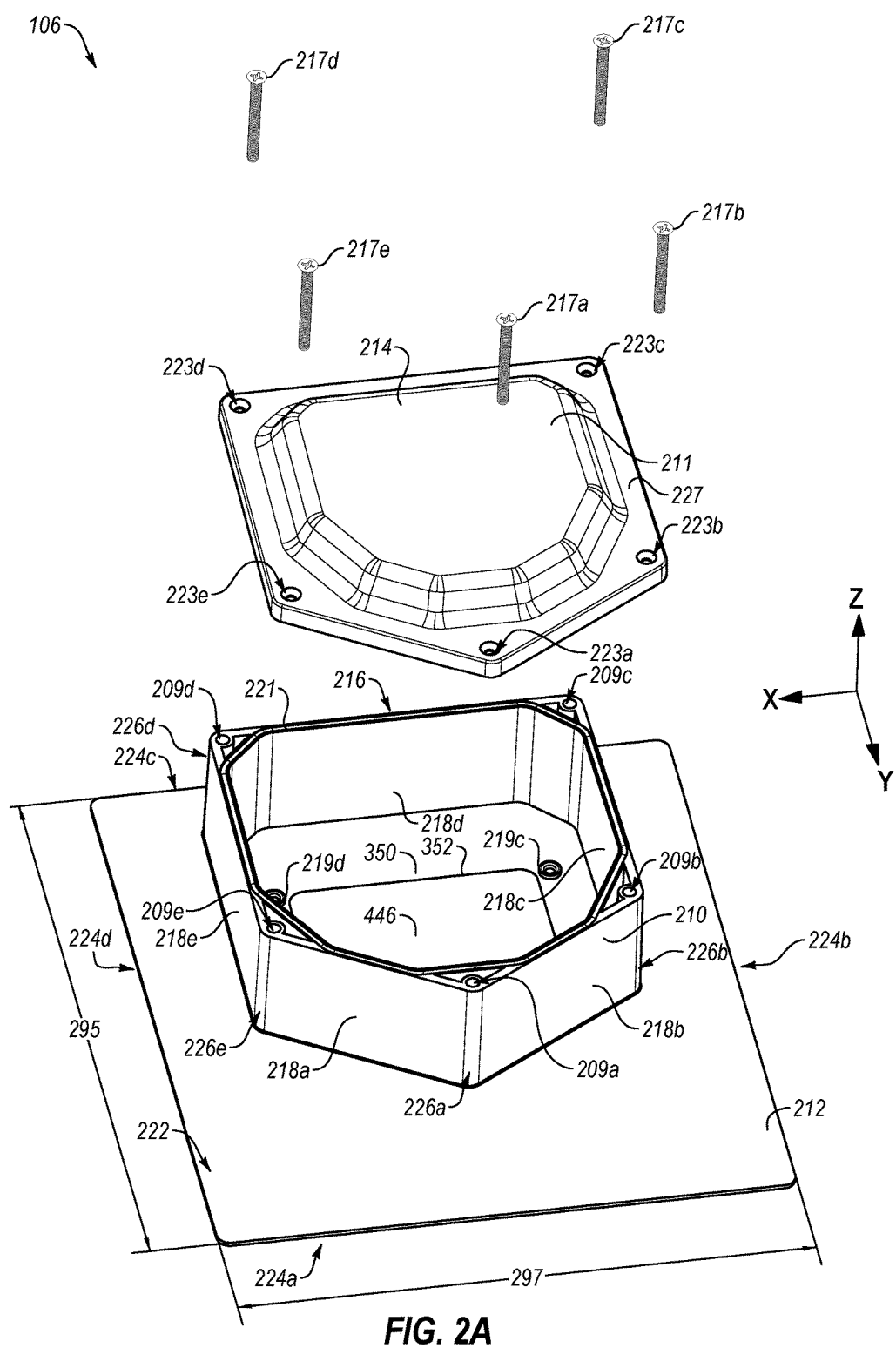
FIG. 2A illustrates a perspective view of the junction box of FIG. 1.
Figure 2B:
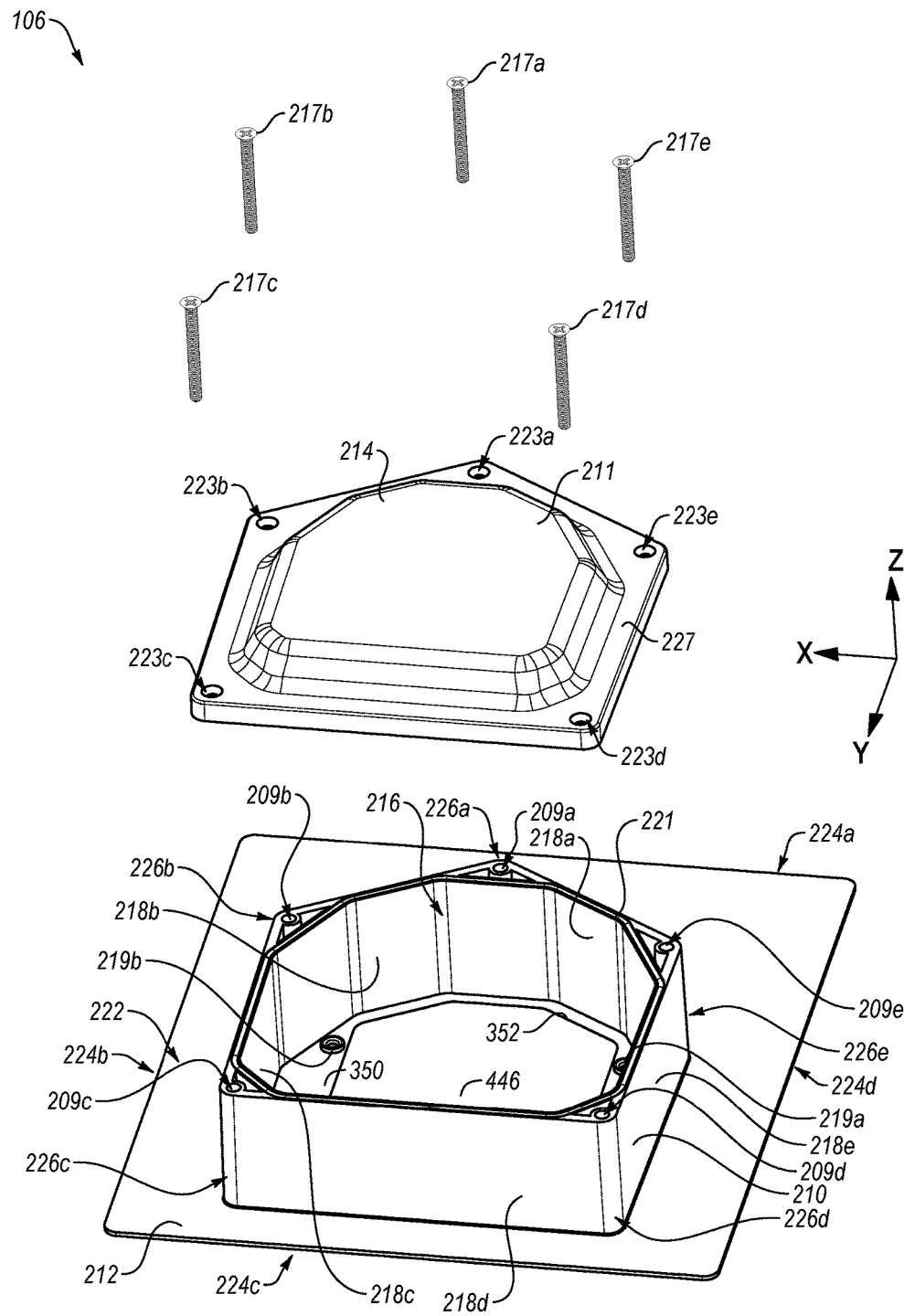
FIG. 2B illustrates another perspective view of the junction box of FIG. 1.
Figure 2C:
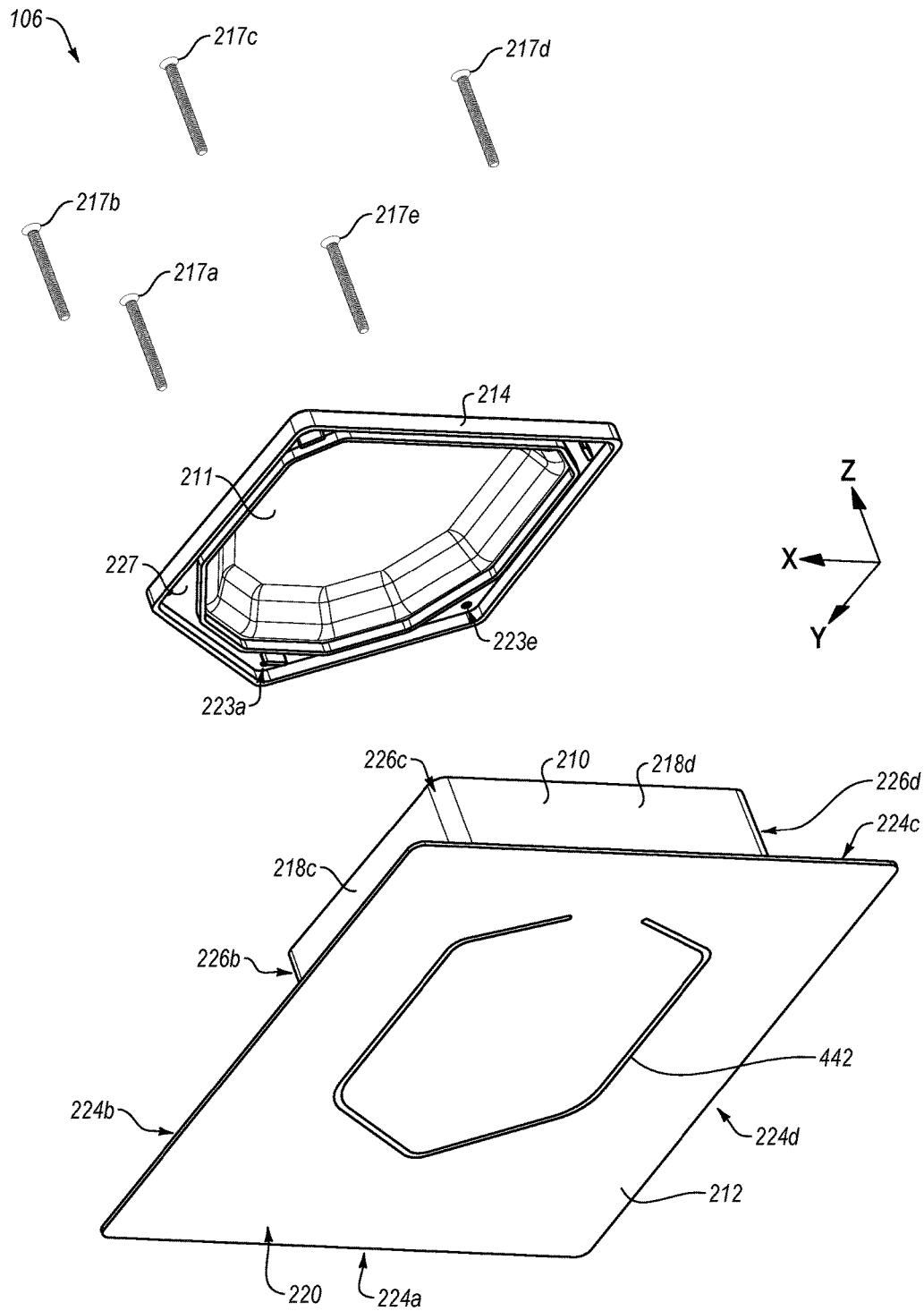
FIG. 2C illustrates another perspective view of the junction box of FIG. 1.

FIGS. 2A, 2B, and 2C illustrate perspective views of an embodiment of the junction box 106 of FIG. 1. The junction box 106 may be implemented on an external surface of a structure and may provide a structure through which cables, wires, and/or other devices may be routed.

With combined reference to FIGS. 2A-2C, the junction box 106 may include a flashing 212, a housing 210, and a lid 214. The flashing 212 may include at least one of a first edge 224a, a second edge 224b, a third edge 224c, and a fourth edge 224*d* (generally, edge 224 or edges 224). The edges 224 may define a perimeter of the flashing 212.

A portion of the flashing 212 may be placed under a portion of an exterior surface of the structure. For example, the portion of the exterior surface may contact a portion of a second surface 222 of the flashing 212 (illustrated in FIGS. 2A and 2B). The portion of the flashing 212 that may be placed under a portion of the exterior surface may extend from the first edge 224*a* up to a second joint 226*b* and a fifth joint 226*e* of the housing 210. For example, an end of the portion of the exterior surface may be coplanar with the second joint 226*b* and the fifth joint 226*e*. Additionally, at least a portion of a first surface 220 of the flashing 212 (e.g., illustrated in FIG. 2C) may contact the structure.

The first surface 220 of the flashing 212 may define a first groove 442 (e.g., illustrated in FIG. 2C). A size and a position of the first groove 442 may correspond to a size and/or a position of a second groove 352 (e.g., illustrated in FIGS. 2A and 2B). The first groove 442 may indicate suitable placement of sealant or other suitable adhesive on the first surface 220 of the flashing 212. Suitable placement of the sealant may be between the first groove 442 and the edges 224 of the flashing 212. The suitable placement may prevent a user from placing a hole in a bottom portion 350 of the housing 210 that corresponds to where the sealant may be placed. In some embodiments, the sealant may be placed in a semi-circle shape. The first groove 442 may provide a reference for a radius of the semi-circle shape.

Although, the first groove 442 as illustrated is substantially an open ended hexagonal groove defined by the first surface 220 of the flashing 212, it is understood that the first groove 442 may include another appropriate indicia for indication of suitable placement of the sealant on the first surface 220 of the flashing 212.

The housing 210 may provide a durable and environmentally sealed device for routing cables, wires, and/or other devices from an external device mounted on an external surface of a structure to an internal space of the structure.

The housing 210 may be attached to the flashing 212. Additionally, the housing 210 may be positioned a distance from the edges 224. The distance the housing 210 is positioned from the edges 224 may be such that the perimeter of the second groove 352 is at least a particular distance from the edges 224. Additionally or alternatively, the housing 210 may be positioned from the edges 224 such that a first boss 219*a*, a second boss 219*b*, a third boss 219*c*, and a fourth boss 219*d* (generally, boss 219 or bosses 219) are at least the particular distance from the edges 224. The particular distance is discussed in more detail with reference to FIGS. 3B and 4B.

Additionally, the housing 210 may be positioned such that a first joint 226*a* is oriented towards the first edge 224*a*. The first joint 226*a* may be formed such that, when the junction box 106 is installed, the first joint 226*a* is oriented towards an apex of the exterior surface of the structure, such as the apex of a roof. Additionally, a first sidewall 218*a* and a second sidewall 218*b* may be positioned such that an angle formed by the first sidewall 218*a* and the second sidewall 218*b* at the first joint 226*a* may be between five degrees and one hundred seventy degrees. For example, the angle may be between sixty five degrees and one hundred twenty degrees. Furthermore, the first sidewall 218*a* and the second sidewall 218*b* may form the first joint 226*a* such that the first joint 226*a* is oriented towards the apex of a structure, which may permit the junction box 106 to be installed without fluid pooling on surfaces of the housing 210.

An area on a third sidewall 218*c*, a fourth sidewall 218*d*, and a fifth sidewall 218*e* of the housing 210 may indicate suitable positions for creating holes in the housing 210 (e.g., suitable hole positions in the housing 210). The suitable positions for creating holes in the housing 210 may be configured for electrical metallic tubing (EMT) connectors, strain reliefs, polyvinyl (PVC) connectors, Rigid connectors, non-metallic liquid tight conduit, or any other appropriate connector type for routing the cables, wires, and/or other devices through a hole in the housing 210 and environmentally sealing the hole. For example, the suitable positions for creating holes in the housing 210 may permit connectors that include a diameter between about a quarter inch and about two inches to be used. The areas on the third sidewall 218*c*, the fourth sidewall 218*d*, and the fifth sidewall 218*e* may permit connectors to be fitted to the housing 210 in more places and/or using more types of connectors. Additionally, the areas on the third sidewall 218*c*, the fourth sidewall 218*d*, and the fifth sidewall 218*e* may permit connectors to be fitted on more sides of the housing 210, which may also permit the junction box 106 to be installed in a place on the exterior surface that reduces a number of connectors or a distance between the junction box 106 and an external device. The areas on the third sidewall 218*c*, the fourth sidewall 218*d*, and the fifth sidewall 218*e* are discussed in more detail below in relation to FIGS. 5A and 5B.

The housing 210 may include the first sidewall 218*a*, the second sidewall 218*b*, the third sidewall 218*c*, the fourth sidewall 218*d*, and the fifth sidewall 218*e* (generally, sidewalls 218 or sidewall 218). The first sidewall 218*a* and the second sidewall 218*b* may form the first joint 226*a*. The second sidewall 218*b* and the third sidewall 218*c* may form the second joint 226*b*. The third sidewall 218*c* and the fourth sidewall 218*d* may form a third joint 226*c*. The fourth sidewall 218*d* and the fifth sidewall 218*e* may form a fourth joint 226*d*. The fifth sidewall 218*e* and the first sidewall 218*a* may form the fifth joint 226*e*. The first joint 226*a*, the second joint 226*b*, the third joint 226*c*, the fourth joint 226*d*, and the fifth joint 226*e* may be generally referred to as joints 226 or joint 226 in the present disclosure.

The bottom portion 350 may be attached to the sidewalls 218. The second groove 352 may indicate suitable positions for creating a hole in the bottom portion 350 (e.g., suitable hole positions in the bottom portion 350). For example, a first portion 446 of the bottom portion 350 may be positioned within a perimeter of the second groove 352 and may be a suitable position for creating a hole in the bottom portion 350. Furthermore, placement of the second groove 352 may permit the junction box 106 to be installed in a place on the exterior surface that reduces a number of connectors or a distance between the junction box 106 and an external device rather than being installed to avoid rafters and/or other support structures.

In some embodiments, the second groove 352 may indicate suitable placement positions of fasteners for attaching the junction box 106 to the structure. Placement of the fasteners within the housing 210 rather than the second surface 222 of the flashing 212 may prevent the fasteners from falling and getting lost because the fasteners may remain within the housing 210 if dropped. Additionally or alternatively, the second groove 352 may indicate suitable placement of fasteners for attaching a din rail or any other appropriate device to the junction box 106.

Although, the second groove 352 as illustrated is a substantially pentagonal groove defined by the bottom portion 350, it is understood that the second groove 352 may include any appropriate indicia for indicating suitable positions for creating a hole in the bottom portion 350. For example, the second groove 352 may include a different color than a color of the bottom portion 350, hatching, or any other appropriate indicia. Additionally, although, the second groove 352 as illustrated is a pentagonal shape, it is understood that the second groove 352 may include a square, a rectangle, a triangle, or any other appropriate shape.

In some embodiments, the junction box 106 may include a din rail (not illustrated). In some embodiments, the din rail may be attached to the junction box 106 within the internal volume of the housing 210 via one or more of the bosses 219. Alternatively, in some embodiments, the din rail may be attached to the junction box 106 within the internal volume of the housing 210 via one or more holes created within the second groove 352. Additionally, the din rail may include one or more terminal blocks that are attached to the din rail. The din rail and the terminal blocks may be used for routing and/or connecting the cables, wires, and/or other devices from the external device to the internal volume of the structure. The terminal blocks may be connectors that electrically couple two or more cables, wires, and/or other devices to each other by coupling the two or more cables, wires, and/or other devices to one or more conductive portions of the terminal blocks.

In some embodiments, the sidewalls 218 may define a gasket groove (not illustrated) along an upper surface of the sidewalls 218. A gasket 221 (e.g., an O-ring, a formed in place (FIP) gasket, or a cure in place (CIP) gasket) may be placed, formed, or cured so as to at least partially be within the gasket groove. The gasket 221 may extend beyond the gasket groove in the z-direction when placed, formed, or cured in the gasket groove. In some embodiments, the gasket 221 may be pliable so as to conform to the shape of the gasket groove. For example, the gasket 221, when placed in the gasket groove, may form a shape that is substantially similar to the shape of the housing 210 (e.g., a pentagon as illustrated in FIGS. 2A-2C). In other embodiments, the gasket 221 may be pre-formed to the shape of the gasket groove. Alternatively, the gasket 221 may be formed or cured within the gasket groove so as to take the shape of the housing 210. The gasket 221, when placed, formed, or cured in the gasket groove, may substantially surround an opening 216 on a plane substantially parallel to the second groove 352.

Alternatively, the lid 214 may define a gasket groove (not illustrated) along a bottom surface of the lid 214. The gasket 221 (e.g., an O-ring, a FIP gasket, or a CIP gasket) may be placed, formed, or cured so as to at least partially be within the gasket groove defined by the lid 214. The gasket 221 may extend beyond the gasket groove in the z-direction when placed, formed, or cured in the gasket groove.

The junction box 106 may include at least one of a first fastener 217a, a second fastener 217b, a third fastener 217c, a fourth fastener 217d, and a fifth fastener 217e (generally, fasteners 217 or fastener 217). The lid 214 may selectively attach to the housing 210 via the fasteners 217. In some embodiments, the fasteners 217 may include snap on fasteners, friction fit fasteners, or any other appropriate fastener type for attaching the lid 214 to the housing 210. The lid 214 when attached to the housing 210 may environmentally seal the internal volume of the housing 210 (e.g., a volume defined by the lid 214, the bottom portion 350, and the sidewalls 218). The internal volume is discussed in more detail below in relation to FIG. 3A.

The lid 214 may define at least one of a first opening 223a, a second opening 223b, a third opening 223c, a fourth opening 223d, and a fifth opening 223e (generally, openings 223 or opening 223). The openings 223 may be defined so as to permit the fasteners 217 to pass through.

In some embodiments, the housing 210 may define a first receiver opening 209a, a second receiver opening 209b, a third receiver opening 209c, a fourth receiver opening 209d, and a fifth receiver opening 209e (generally, receiver openings 209 or receiver opening 209). Each receiver opening 209 may be concentric with a corresponding opening 223. In some embodiment, the receiver openings 209 may be positioned proximate the joints 226. The receiver opening 209 may be configured to receive the fasteners 217 so as to attach the lid 214. In some embodiments, the fasteners 217 may include screws with threads that mate with a threaded portion of the receiver openings 209. In other embodiments, the housing 210 may not define the receiver openings 209 and the fasteners 217 may include self-tapper screws that are configured to create tapper openings (not illustrated) that operate the same as or similar to the receiver opening 209.

In some embodiments, the receiver openings 209 may include a threaded portion, a snap on portion, a friction fit portion, or any other appropriate type of portion for receiving the fasteners 217 and attaching the lid 214 to the housing 210.

Each of the fasteners 217 may include a head portion (e.g., a head) that is sized so as to be larger than the openings 223. The fasteners 217 being attached (e.g., fastened) to the housing 210 may cause the head portions to contact an area substantially surrounding the openings 223 and cause the lid 214 to move towards the housing 210. For example, the fasteners 217 may include countersunk screws and the openings 223 may be defined to include a countersunk portion, the head portion of the fasteners 217 may contact the countersunk portion of the openings 223 and move the lid 214 toward the housing 210. As the lid 214 is moved towards the housing 210, the gasket 221 may be compressed between a portion of the lid 214 and the portion of the upper surface of the sidewalls 218 that defines the gasket groove. Alternatively, in some embodiments, as the lid 214 is moved towards the housing 210, the gasket 221 may be compressed between the portion of the lid 214 that defines the gasket groove and a portion of the upper surface of the sidewalls 218. The lid 214, when attached to the housing 210, may apply pressure on the gasket 221 and force the gasket 221 toward the sidewalls 218 in the y-direction. Additionally or alternatively, the lid 214, when attached to the housing 210, may compress the gasket 221. In some embodiments, the gasket 221 may include an ethylene propylene diene monomer (EPDM) material or any other appropriate material.

The lid 214 compressing the gasket 221 may environmentally seal the internal volume defined by the lid 214, the bottom portion 350, and the sidewalls 218. The internal volume is discussed elsewhere in the present disclosure.

The lid 214 may be shaped substantially the same as the housing 210. Additionally, the lid 214 may be shaped such that at least a portion of an internal perimeter of the lid 214 may be in contact with a portion of external surfaces of the sidewalls 218.

Additionally, the lid 214 may include a raised portion 211 and a lower portion 227. When the lid 214 is attached to the housing 210, the raised portion 211 may be higher relative to the bottom portion 350 than the lower portion 227. In some embodiments, the raised portion 211 may increase the internal volume defined by the lid 214, the bottom portion 350, and the sidewalls 218 compared to junction boxes that include lids that do not include the raised portion 211. The raised portion 211 and the lower portion 227 are discussed in more detail below in relation to FIG. 3A.

In some embodiments, the housing 210 and the flashing 212 may be comprised of a single unibody piece of material. For example, the housing 210 and the flashing 212 may be formed using mold injection techniques as a single piece. In other embodiments, the housing 210 and the flashing 212 may comprise multiple pieces of material formed into a single device during manufacturing. For example, the housing 210 may comprise plastic and the flashing 212 may comprise metal (e.g., aluminum) that are formed together as a single device during manufacturing. As another example, the housing 210 may comprise metal and the flashing 212 may comprise plastic that are formed together as a single device during manufacturing. In some embodiments, the housing 210 and the flashing 212 may comprise multiple pieces of material that are attached to each other using sealant or any other appropriate device. Additionally, in some embodiments, the lid 214 may comprise plastic. Alternatively, in some embodiments, the lid 214 may comprise metal.

In some embodiments, the housing 210, the flashing 212, and the lid 214 may include a non-conductive material. In some embodiments, the housing 210, the flashing 212, and the lid 214 may include a plastic material, a polycarbonate material, a PVC material, an acrylonitrile butadiene styrene (ABS) material, acrylonitrile styrene and polycarbonate blend (ASA+PC) material, a polycarbonate and ABS blend (PC+ABS) material, or any other appropriate non-conductive material. In these and other embodiments, the housing 210, the flashing 212, and the lid 214 material may be infused with a non-conductive ultraviolet (UV) resistant material. For example, the housing 210, the flashing 212, and the lid 214 may be infused with a low molecular weight hydroxyphenyl-benzotriazole material, a high molecular weight hydroxyphenyl-benzotriazole material, or any other appropriate non-conductive UV resistant material. The housing 210, the flashing 212, and the lid 214 not comprising conductive material may limit a number of connections to the junction box 106 since the junction box 106 will not need to be grounded. Alternatively, in some embodiments, one or more of the housing 210, the flashing 212, and the lid 214 may include a metallic material.

The flashing 212 may include a width 297 (e.g., illustrated in FIG. 2A) defined between the second edge 224b and the fourth edge 224d and a length 295 (e.g., illustrated in FIG. 2A) defined between the first edge 224a and the third edge 224c. In some embodiments, the width 297 may be between about six inches and about fourteen inches. In these and other embodiments, the length 295 may be between about six inches and about eighteen inches. The flashing 212 may include a thickness defined in the z-direction between 0.06 inches and an inch. Additionally, the edges 224 may form corners of the flashing 212. In some embodiments, the corners may be formed to include a substantially ninety degree angle. In other embodiments, the corners may be formed to include a radius. The radius may be between about one-half inches and about three inches.

The sidewalls 218 may include a thickness between about 0.06 inches and about one inch. The bottom portion 350 may include a thickness defined in the z-direction between about 0.06 inches and about one inch. The sidewalls 218 may extend a height above the second surface 222. In some embodiments, the height of the sidewalls 218 may be equal to or greater than about two and a half inches. In other embodiments, the height of the sidewalls 218 may be equal to or less than about fourteen inches.

In some embodiments, the joints 226 may be formed to form a sharp point. In other embodiments, the joints 226 may be formed to form a rounded point. Although, the sidewalls 218 as illustrated form a pentagonal or substantially pentagonal shape, it is understood that the sidewalls 218 may form any appropriate shape for shedding fluid and attaching one or more connectors to the sidewalls 218.

Additionally, in some embodiments, the fourth joint 226d and the fifth joint 226e may be formed so as to form an angle equal to greater than ninety degrees (e.g., the fifth sidewall 218e may be positioned at an angle equal to greater than ninety degrees relative to the fourth sidewall 218d and the third sidewall 218c may be positioned at an angle equal to greater than ninety degrees relative to the fourth sidewall 218d).

In some embodiments the third sidewall 218c, the fourth sidewall 218d, and the fifth sidewall 218e may define one or more dimples (not illustrated). In these and other embodiments, the third sidewall 218c, the fourth sidewall 218d, and the fifth sidewall 218e may define a center dimple that may be aligned with a center portion of the sidewalls 218. The center portion may be equidistant from the joints 226 partially formed by the sidewalls 218. In some embodiments, the third sidewall 218c, the fourth sidewall 218d, and the fifth sidewall 218 may define one or more weep holes (not illustrated). The weep holes may be configured to permit any fluid that is positioned within the internal volume defined by the lid 214, the sidewalls 218, and the bottom portion 350 to exit the internal volume via the weep hole(s).

In some embodiments, the third sidewall 218c, the fourth sidewall 218d, and the fifth sidewall 218e may define multiple equidistant dimples. Equidistant dimples may be equally distanced from each other and/or from the joints 226 at least partially formed by the sidewalls 218. In some embodiments, the third sidewall 218c, the fourth sidewall 218d, and the fifth sidewall 218e may define the dimples to be equidistant from each other and may also define one of the dimples as a center dimple. The dimples may indicate suitable positions for creating a hole in the sidewalls 218 (e.g., suitable hole positions in the sidewalls 218).

Additionally, in some embodiments, the junction box 106 may include a retention system (not illustrated). The retention system may selectively attach the lid 214 to the flashing 212. The retention system may be employed to prevent the lid 214 from falling or becoming separated from the housing 210 and/or the flashing 212. In some embodiments, the flashing 212 may be omitted. In these and other embodiments, the retention system may selectively attach the lid 214 to a sidewall 218. The retention device may include a chord, a strap, a rope, a band, a bungee cord, a hinge or any other appropriate device for selectively attaching the lid 214 to the flashing 212.

Figure 3A:
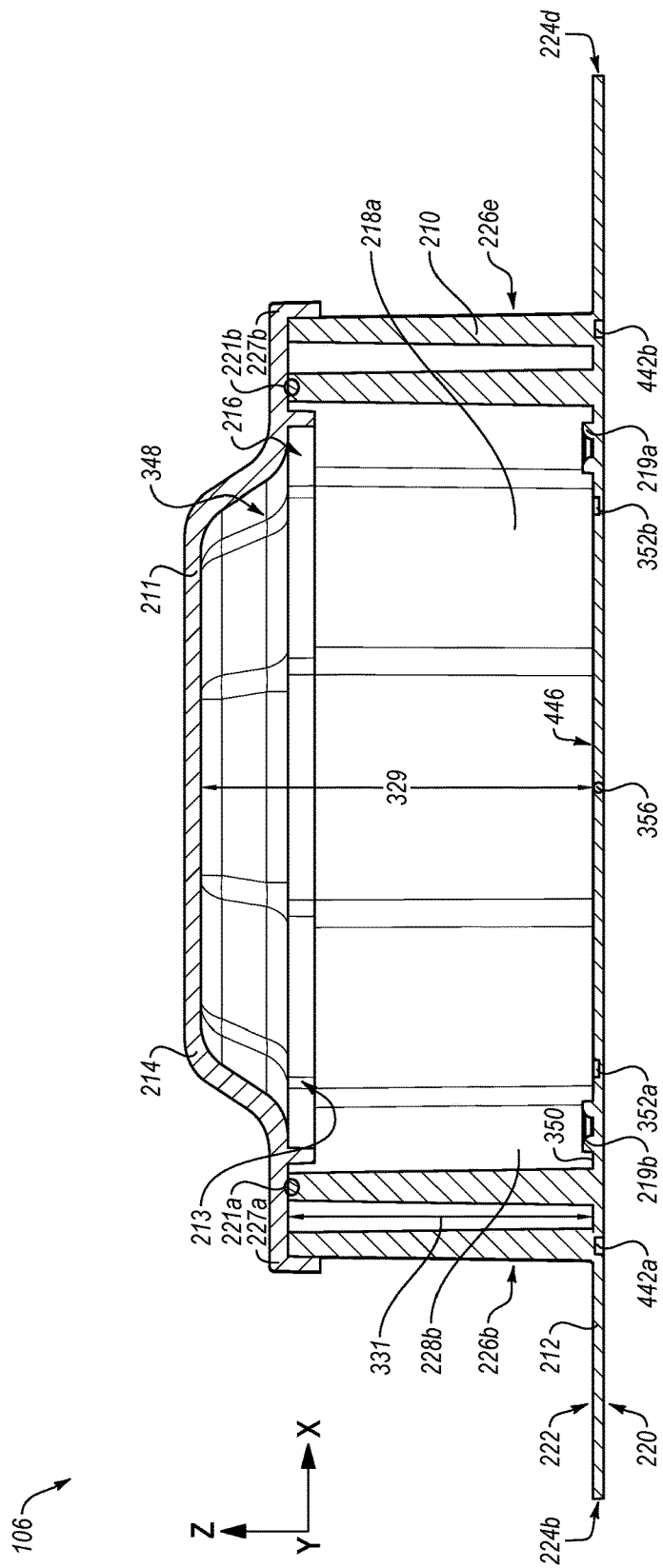
FIG. 3A illustrates another view of the junction box of FIG. 1.
Figure 3B:
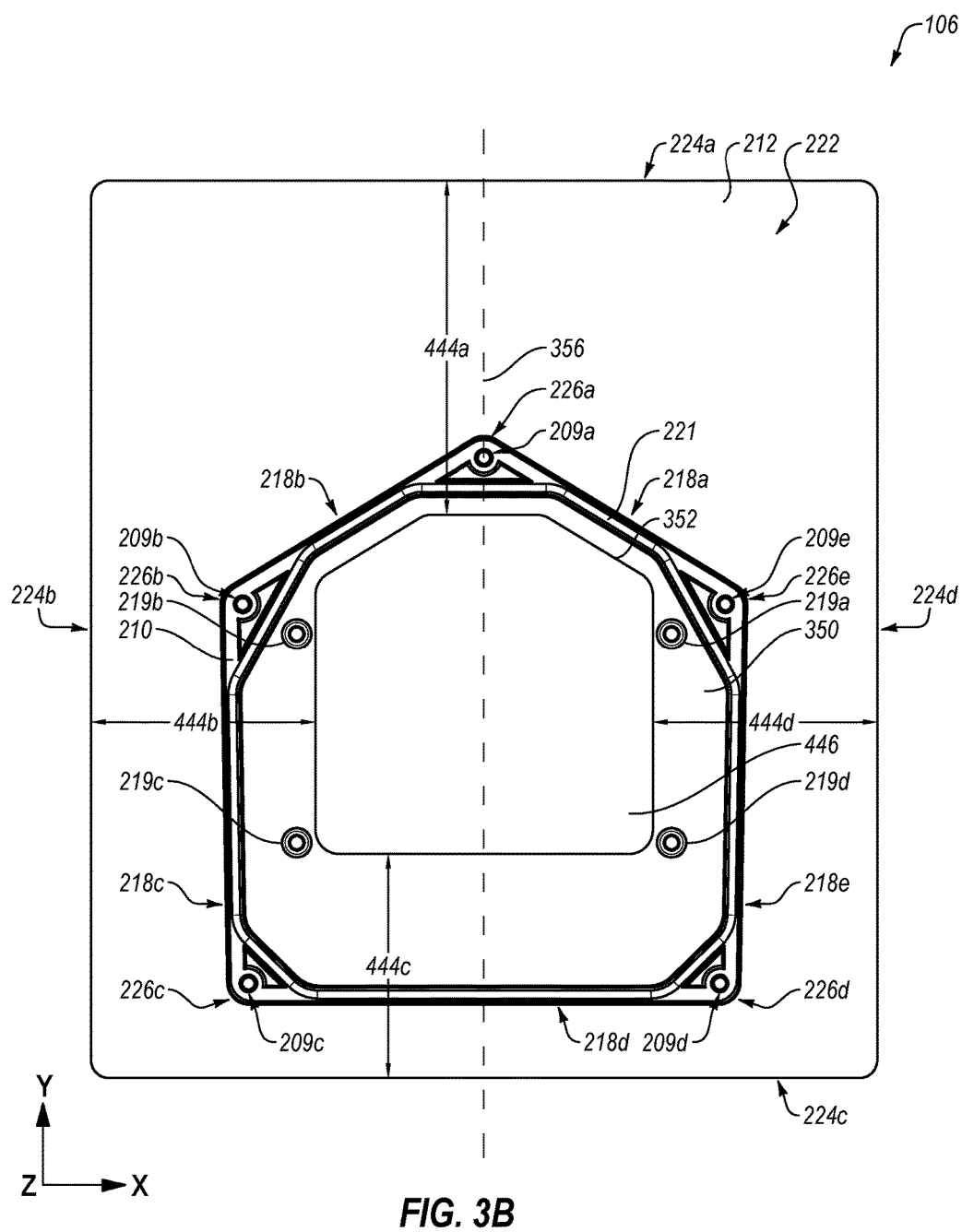
FIG. 3B illustrates another view of the junction box of FIG. 1.
Figure 4A:
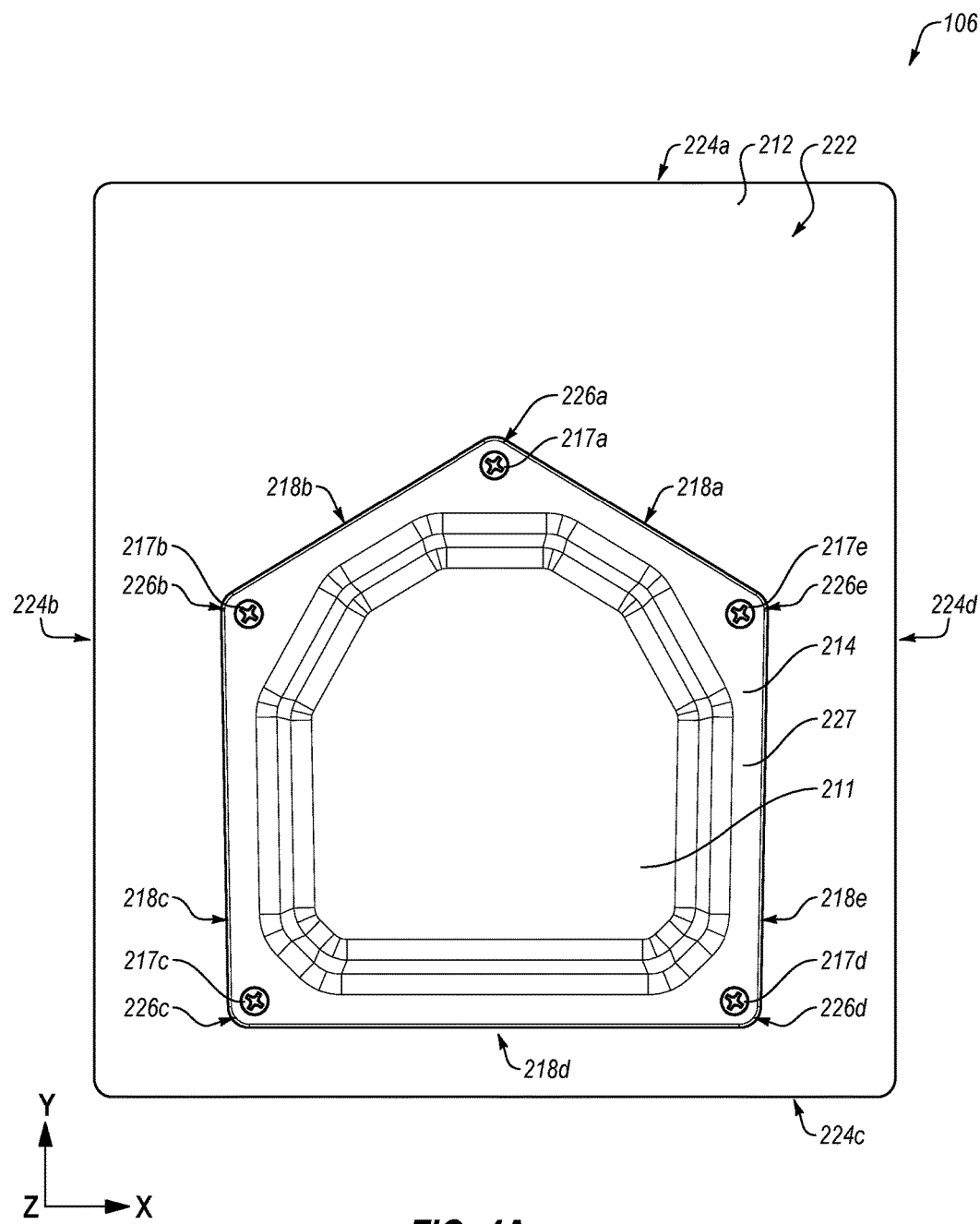
FIG. 4A illustrates another view of the junction box of FIG. 1.
Figure 4B:
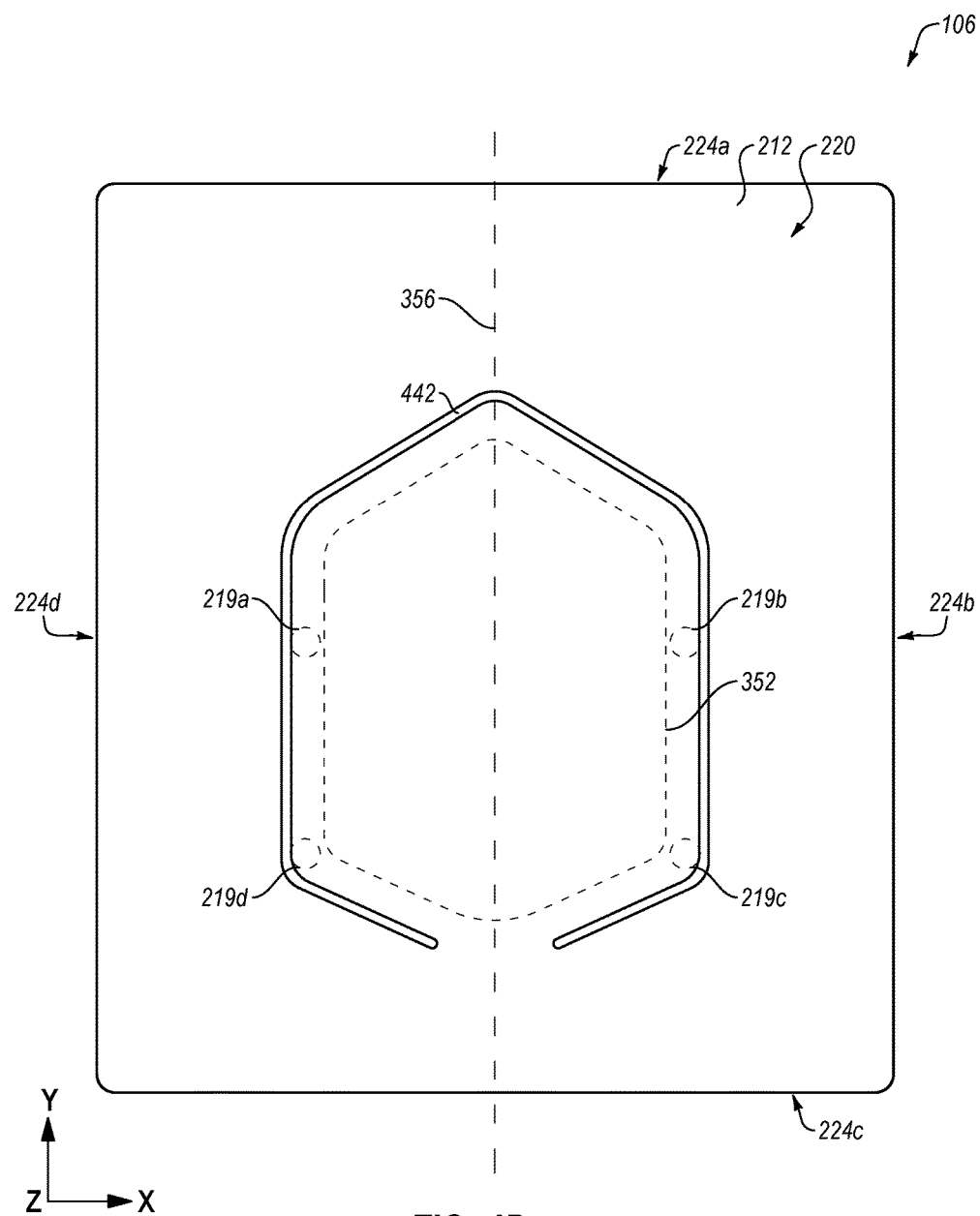
FIG. 4B illustrates another view of the junction box of FIG. 1.

FIG. 3A illustrates a sectional view of the junction box 106 of FIGS. 2A-2C. FIG. 3B illustrates a top view of the junction box 106 of FIGS. 2A-2C. FIG. 3A is a side-sectional view across the housing 210 in a first direction. FIGS. 4A and 4B illustrate a top view and a bottom view, respectively of the junction box 106 of FIGS. 2A-2C with the lid 214 attached to the housing 210. FIGS. 3A-4B include components and features described with reference to FIGS. 2A-2C. Description of these components and features are not repeated with reference to FIGS. 3A-4B.

The opening 216 may provide access to an internal volume 348 of the housing 210 (e.g., illustrated in FIG. 3A). The internal volume 348 may be defined by the bottom portion 350, the sidewalls 218, and the lid 214 when the lid 214 is attached to the housing 210.

The first surface 220 may be on a substantially parallel plane to the second surface 222 of the flashing 212. In the depicted embodiment, the first groove 442 and the second groove 352 may be coincident around an axis 356. In some embodiments, the axis 356 may be positioned at a center axis of the housing 210 and the flashing 212 in the y-direction. In other embodiments, the axis 356 may be positioned at another point of the housing 210 and the center axis of the flashing in the y-direction. In these and other embodiments, the axis 356 may be positioned at another point of the flashing 212 and the center axis of the housing 210 in the y-direction. In some embodiments, the first groove 442 and the second groove 352 may not be coincident around the axis 356.

The raised portion 211, when the lid 214 is attached to the housing 210, may be a first distance 329 away from the bottom portion 350 (e.g., illustrated in FIG. 3B). The lower portion 227a-b, when the lid 214 is attached to the housing 210, may be a second distance 331 away from the bottom portion 350 (e.g., illustrated in FIG. 3B). The first distance 329 may be equal to or greater than the second distance 331. In some embodiments, the first distance 329 may be equal to or greater than substantially two inches. In these and other embodiments, the second distance 331 may be equal to or greater than substantially one inch. The raised portion 211, when the first distance 329 is greater than the second distance 331, may increase the internal volume 348 defined by the bottom portion 350, the sidewalls 218, and the lid 214 when the lid 214 is attached to the housing 210.

The perimeter of the second groove 352 may be a first distance 444a away from the first edge 224a (e.g., illustrated in FIG. 3B), a second distance 444b away from the second edge 224b (e.g., illustrated in FIG. 3B), a third distance 444c away from the third edge 224c (e.g., illustrated in FIG. 3B), and a fourth distance 444d away from the fourth edge 224d (e.g., illustrated in FIG. 3B). The first distance 444a, the second distance 444b, the third distance 444c, and the fourth distance 444d are collectively referred to as distances 444.

In some embodiments, each of the distances 444 may be equal to or greater than the particular distance. The particular distance may be selected to ensure that the fasteners and any holes are implemented in an interior portion of the junction box 106. Additionally, in some embodiments, at least some of the distances 444 may be equal to one another. For example, the second distance 444b, the third distance 444c, and the fourth distance 444d may be equal to each other and the first distance 444a may be different. In other embodiments, the distances 444 may all be different from one another. In some embodiments, the particular distance may be equal to or greater than about one inch. For example, the particular distance may be equal to about one and a half inches. As another example, the particular distance may be equal to about two inches.

In some embodiments, a distance from a center axis of the second groove 352 in the y direction to a center axis of the first groove 442 in the y direction may be equal to or greater than substantially one quarter inch.

In some embodiments, the first portion 446 of the bottom portion 350 may include an EPDM rubber material. In other embodiments, the first portion 446 of the bottom portion 350 may include a thickness that is less than the thickness of the bottom portion 350 between the perimeter of the second groove 352 and the sidewalls 218. The first portion 446 of the bottom portion 350 may permit an EMT pipe or any other appropriate connector type to push through the first portion 446 of the bottom portion 350 so as to create an appropriately sized and positioned hole in the first portion 446 of the bottom portion 350. In some embodiments, the first portion 446 may not be included (e.g., the first portion 446 may be pre-cut) so that no material is cut during installation of the junction box 106 on a structure.

In some embodiments, the bosses 219 may be disposed within an internal perimeter of the first groove 442 and outside an external perimeter of the second groove 352 (e.g., illustrated in FIG. 4B). In these and other embodiments a distance between the internal perimeter of the first groove 442 and the external perimeter of the second groove 352 may be equal to or greater than one quarter inch.

In some embodiments, the second groove 352 may include indicia (not illustrated) indicating suitable placement of fasteners used for attaching the junction box 106 to a structure (e.g., 108 of FIG. 1). The indicia may indicate suitable fastener locations in the bottom portion 350. The indicia may indicate suitable zones for placement of the fasteners to balance a load associated with attachment of the junction box 106 to the structure.

Figure 5A:
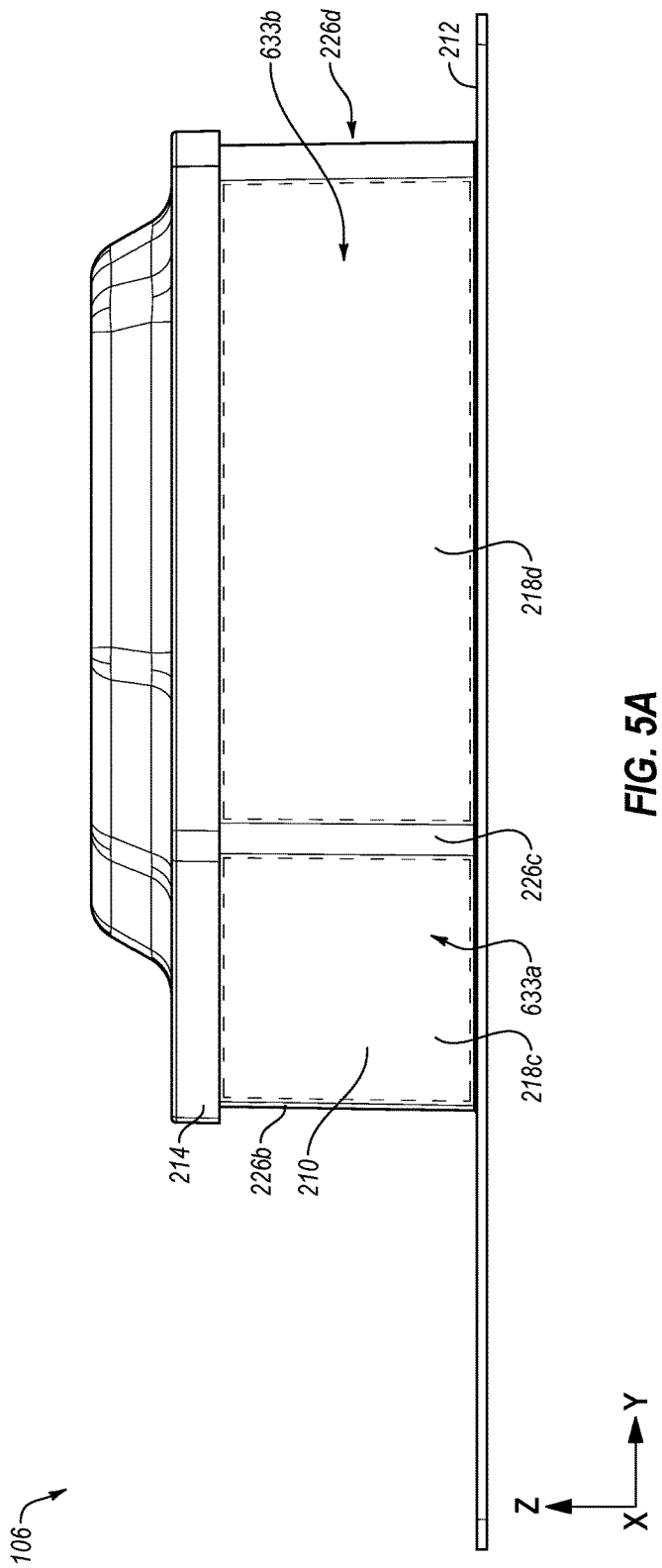
FIG. 5A illustrates another view of the junction box of FIG. 1.

FIGS. 5A and 5B illustrate side sectional views of the junction box 106 of FIGS. 2A-2C. FIGS. 5A and 5B include components and features described with reference to FIGS. 2A-2C. Description of these components and features are not repeated with reference to FIGS. 5A and 5B. In some embodiments, when the lid 214 is attached to the housing 210, the lid 214, the flashing 212, and the joints 226 may define a first area 633a (e.g., illustrated in FIG. 5A), a second area 633b (e.g., illustrated in FIG. 5A), and a third area 633c (e.g., illustrated in FIG. 5B). For example, the lid 214, the flashing 212, the second joint 226b, and the third joint 226c may define the first area 633a; the lid 214, the flashing 212, the third joint 226c, and the fourth joint 226d may define the second area 633b; and the lid 214, the flashing 212, the fourth joint 226d, and the fifth joint 226e may define the third area 633c. The first area 633a, the second area 633b, and the third area 633c may be generally referred to as areas 633 or area 633 in the present disclosure.

The areas 633 may indicate suitable positions for creating a hole in the sidewalls 218 (e.g., suitable hole positions in the sidewalls 218). For example, the first area 633a may indicate suitable positions for creating a hole in the third sidewall 218c, the second area 633b may indicate suitable positions for creating a hole in the fourth sidewall 218d, and the third area 633c may indicate suitable positions for creating a hole in the fifth sidewall 218e.

Figure 6:
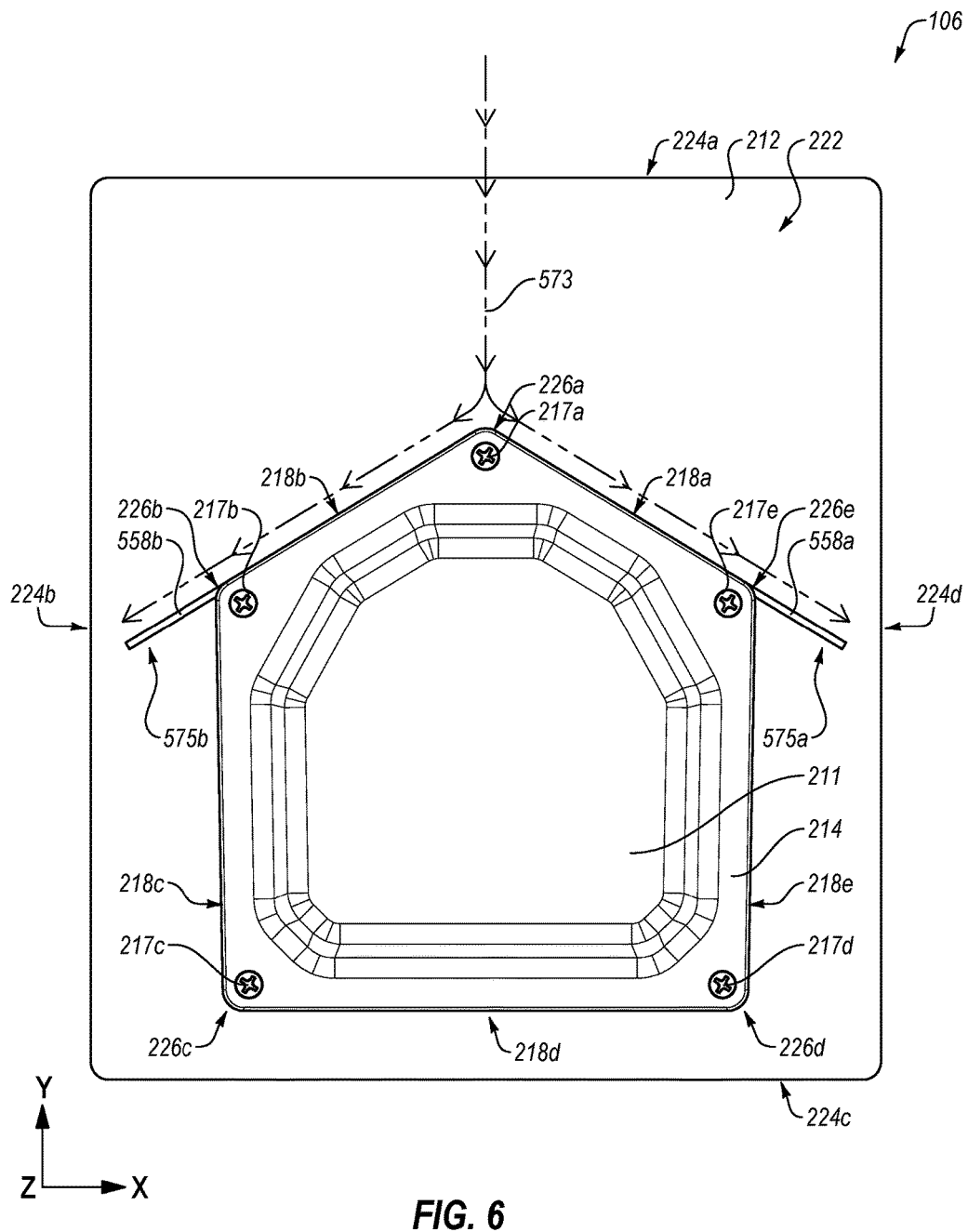
FIG. 6 illustrates another view of the junction box of FIG. 1.

FIG. 6 illustrates the junction box 106 of FIG. 1 implemented with eaves 558a and 558b (generally, eave 558 or eaves 558). FIG. 6 depicts a view of the junction box 106 with the eaves 558 that is substantially similar to the view of FIG. 4A. The eaves 558 may be employed with the junction box 106 to shed a fluid 573 such as rain or melted snow away from the sidewalls 218 of the housing 210. Implementation of the eaves 558 may reduce introduction of the fluid 573 to the junction box 106 and may increase the life of the junction box 106.

In the depicted embodiment, the first eave 558a may extend from the fifth joint 226e all the way to or at least partially towards the fourth edge 224d. The term "all the way to" may describe embodiments in which an end of the first eave 558a may be coplanar with the fourth edge 224d. Similarly, the second eave 558b may extend from the second joint 226b all the way to or at least partially towards the second edge 224b. Extension of the eaves 558 towards the edges 224b and 224d may further divert the fluid 573 away from the fifth joint 226e and the second joint 226b. In particular, extension of the eaves 558 past the sidewalls 218a and 218b may divert the fluid 573 onto portions of the exterior surface that surrounds the junction box 106.

In some embodiments, the first eave 558a may be positioned at an angle that is the same or substantially similar to an angle of the first sidewall 218a relative to the first edge 224a. Likewise, the second eave 558b may be positioned at angle that is the same or substantially similar to an angle of the second sidewall 218b relative to the first edge 224a.

In some embodiments, a height of the eaves 558 from the flashing 212 (e.g., in the z-direction of FIG. 6) may be the same or substantially similar to a distance between the flashing 212 and a bottom edge of the lid 214.

Figure 7:
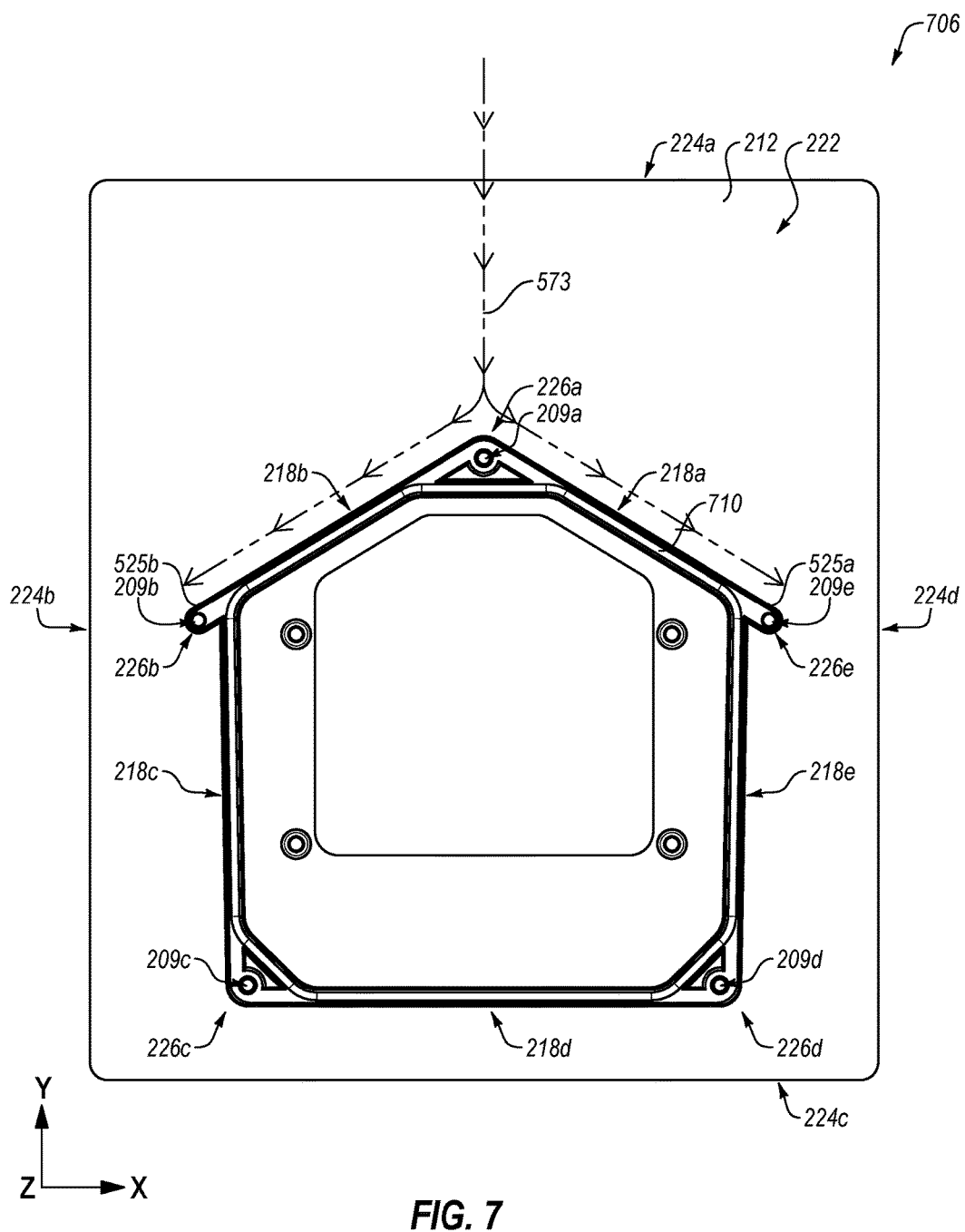
FIG. 7 illustrates an alternative junction box configuration, all arranged in accordance with at least one embodiment described in the present disclosure.

FIG. 7 illustrates an alternative junction box configuration 706. The alternative junction box 706 includes an alternatively shaped housing 710. In some embodiments, an alternative lid (not illustrated) may be sized and shaped substantially the same as or similar to the housing 710 so as to attach to the alternative housing 710 the same as or similar to the lid 214 discussed elsewhere. The alternative junction box 706 may be substantially similar to the junction box 106 described elsewhere in the present disclosure. However, in the alternative junction box 706, the housing 710 may include a first nodule 525a and a second nodule 525b. The first nodule 525a may form part of the second joint 226b. The second nodule 525b may form part of the fifth joint 226e. Additionally, the second receiver opening 209b may be positioned within a portion of the second nodule 525b that extends beyond the third sidewall 218c in the x-direction. Additionally or alternatively, the second receiver opening 209b may be positioned within a portion of the second nodule 525b that extends beyond the second sidewall 218b in the y-direction. Likewise, the fifth receiver opening 209e may be positioned within a portion of the first nodule 525a that extends beyond the fifth sidewall 218e in the x direction. Additionally or alternatively, the fifth receiver opening 209e may be positioned within a portion of the first nodule 525a that extends beyond the first sidewall 218a in the y-direction. The first nodule 525a and the second nodule 525b may operate the same as or similar to the eaves 558 discussed above in relation to FIG. 6. For example, the first nodule 525a and the second nodule 525b may be employed with the alternative junction box 706 to shed a fluid such as rain or melted snow away from the sidewalls 218 of the housing 710.

The present disclosure is not to be limited in terms of the particular embodiments described in the present disclosure, which are intended as illustrations of various aspects. Many modifications and variations can be made without departing from its spirit and scope, as will be apparent to those skilled in the art. Functionally equivalent methods and apparatuses within the scope of the present disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that the present disclosure is not limited to particular methods, reagents, compounds, compositions, or biological systems, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

The present invention may be embodied in other specific forms without departing from the scope of the present embodiment. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A junction box comprising:
   a flashing that defines a first groove that is disposed relative to a first center axis in a first plane; and
   a housing attached to the flashing and positioned at least a first distance from a plurality of edges of the flashing, the housing including:
      a plurality of sidewalls that form a plurality of joints, the plurality of joints including a first joint formed by a first sidewall and a second sidewall that is oriented towards a first edge of the flashing; and
      a bottom portion that is attached to the plurality of sidewalls, the bottom portion defining a second groove that is disposed relative to a second center axis,
   wherein:
      the second center axis is coincident with the first center axis in a direction that is substantially parallel to the first plane of the first groove;
      the second groove is located on a second plane that is substantially parallel to the first plane of the first groove, and
      the second groove is configured to indicate a suitable hole position in the bottom portion.

2. The junction box of claim 1, wherein the flashing and the housing are a single, unibody piece.

3. The junction box of claim 1, wherein:
   the housing further defines a gasket groove on an upper surface of the plurality of sidewalls; and
   the junction box further comprises:
      a gasket located at least partially within the gasket groove; and
      a lid selectively attachable to the housing such that the lid compresses the gasket between the lid and a portion of the upper surface of the plurality of sidewalls that defines the gasket groove to environmentally seal a volume defined by the housing and the lid.

4. The junction box of claim 3, wherein:
   the lid defines one or more openings;
   the housing defines one or more receiver openings;
   each of the one or more receiver openings is concentric with one of the one or more openings; and
   the junction box further comprises one or more fasteners configured to pass through the openings, attach to the housing via the receiver openings, and selectively attach the lid to the housing such that the lid compresses the gasket between the lid and the portion of the upper surface of the plurality of sidewalls that defines the gasket groove.

5. The junction box of claim 4, wherein each of the receiver openings include a threaded portion.

6. The junction box of claim 3, wherein:
   the lid includes a raised portion and a lower portion; and
   the raised portion and the lower portion are sized and configured such that when the lid is attached to the housing a first distance between the bottom portion and the raised portion is greater than a second distance between the bottom portion of the housing and the lower portion of the lid.

7. The junction box of claim 3, wherein:
the plurality of sidewalls include a third sidewall, a fourth sidewall, and a fifth sidewall; and
when the lid is attached to the housing, the lid; the flashing; and the joints define areas that indicate suitable hole positions for creating a hole in the third sidewall, the fourth sidewall, and the fifth sidewall.

8. The junction box of claim 3, wherein the gasket groove is defined in the upper surface of the sidewalls such that the gasket when positioned in the gasket groove substantially surrounds an internal volume defined by the housing.

9. The junction box of claim 1, the junction box further comprising:
a lid defining a gasket groove on a bottom surface of the lid; and
a gasket located at least partially within the gasket groove, the lid being selectively attachable to the housing such that the lid compresses the gasket between a portion of the lid that defines the gasket groove and a portion of an upper surface of the plurality of sidewalls to environmentally seal a volume defined by the housing and the lid.

10. The junction box of claim 1, wherein the bottom portion of the housing includes one or more bosses for placement of fasteners that are used for attaching the junction box to a structure.

11. The junction box of claim 10, wherein the bosses are disposed within an internal perimeter of the first groove and outside an external perimeter of the second groove.

12. The junction box of claim 11, wherein a distance between the internal perimeter of the first groove and the external perimeter of the second groove is at least one quarter inch.

13. The junction box of claim 1, further comprising:
a first eave attached to a second joint formed by the second sidewall and a third sidewall; and
a second eave attached to a third joint formed by the first sidewall and a fourth sidewall.

14. The junction box of claim 13, wherein:
the first eave is positioned at a first angle relative to the first edge of the flashing;
the first angle is substantially similar to a second angle of the second sidewall relative to the first edge of the flashing; and
the second eave is positioned at a third angle relative to the first edge of the flashing; and
the third angle is substantially similar to a fourth angle of the first sidewall relative to the first edge of the flashing.

15. The junction box of claim 1, wherein the housing and the flashing are comprised at least partially of a polycarbonate material infused with a hydroxyphenyl-benzotriazole material.

16. The junction box of claim 1, wherein the housing further includes a first portion within a perimeter of the second groove, the first portion being comprised at least partially of an ethylene propylene diene monomer (EPDM) rubber.

17. A junction box comprising:
a flashing that defines a first groove that is disposed relative to a first center axis in a first plane; and
a housing attached to the flashing and positioned at least a first distance from a plurality of edges of the flashing, the housing including:
a plurality of sidewalls that define a gasket groove on an upper surface of the plurality of sidewalls and form a plurality of joints, the plurality of joints including a first joint formed by a first sidewall and a second sidewall that is oriented towards a first edge of the flashing; and
a bottom portion that is attached to the plurality of sidewalls and that defines a second groove that is disposed relative to a second center axis that is substantially coincident with the first center axis in a direction that is substantially parallel to the first plane of the first groove, the second groove is located on a second plane that is substantially parallel to the first plane of the first groove and indicating suitable hole positions in the bottom portion;
a gasket located at least partially within the gasket groove; and
a lid selectively attachable to the housing such that the lid compresses the gasket between the lid and a portion of the upper surface of the plurality of sidewalls that defines the gasket groove to environmentally seal a volume defined by the housing and the lid.

18. The junction box of claim 17, wherein:
the lid defines one or more openings;
the housing further defines one or more receiver openings proximate the joints and positioned such that each receiver opening is concentric with an opening;
the junction box further comprises one or more fasteners configured to pass through the openings, attach to the housing via the receiver openings, and selectively attach the lid to the housing such that the lid compresses the gasket between the portion of the upper surface of the plurality of sidewalls that defines the gasket groove and the lid; and
the plurality of sidewalls include a third sidewall, a fourth sidewall, and a fifth sidewall and when the lid is attached to the housing, the lid; the flashing; and the joints define areas that indicate suitable hole positions for creating a hole in the third sidewall, the fourth sidewall, and the fifth sidewall.

19. A junction box comprising:
a housing including:
a plurality of sidewalls that form a plurality of joints; and
a bottom portion that is attached to the plurality of sidewalls and that defines a second groove and a first groove,
wherein:
the first groove is disposed relative to a first center axis in a first plane;
the second groove is disposed relative to a second center axis that is substantially coincident with the first center axis in a direction that is substantially parallel to the first plane of the first groove; and
the second groove is located on a second plane that is substantially parallel to the first plane of the first groove and indicates suitable fastener locations in the bottom portion.

20. The junction box of claim 19, wherein the plurality of sidewalls define a gasket groove on an upper surface of the plurality of sidewalls, the junction box further comprising:
a gasket located at least partially within the gasket groove; and
a lid selectively attachable to the housing such that the lid compresses the gasket between the lid and a portion of the upper surface of the plurality of sidewalls that defines the gasket groove to environmentally seal a volume defined by the housing and the lid.

* * * * *